July 12, 1932.  G. P. LUCKEY ET AL  1,866,660
PRESSURE INDICATOR
Filed Aug. 13, 1930
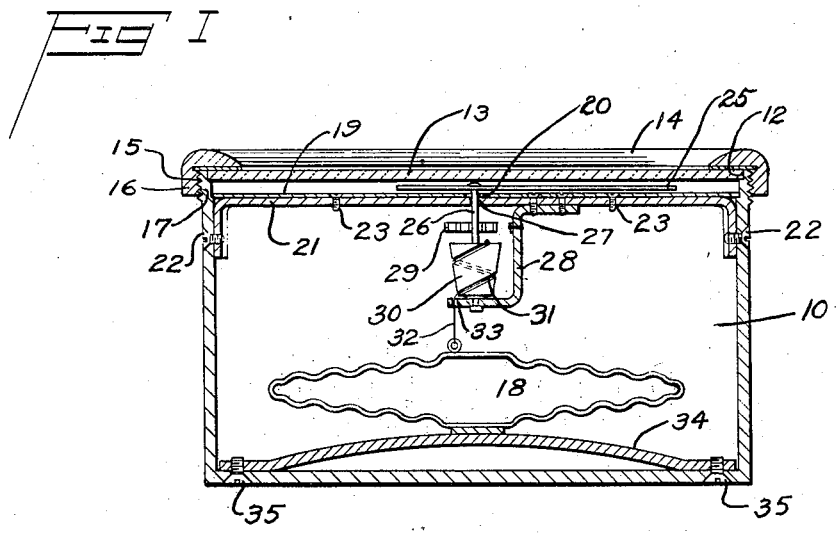
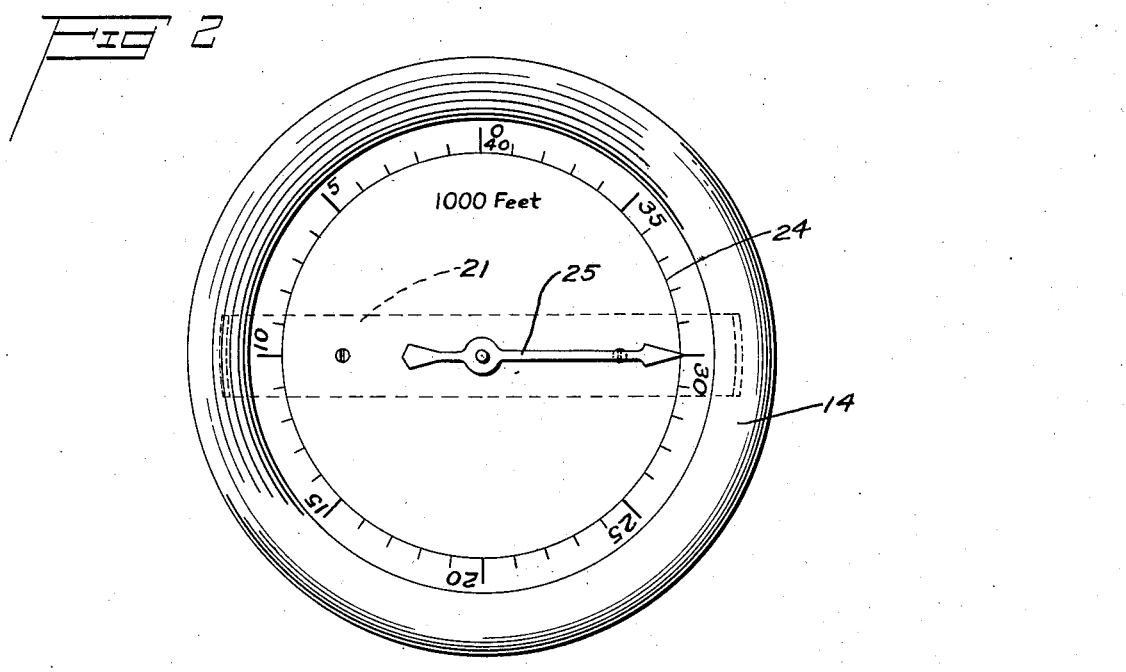
INVENTORS
ALBERT F HEGENBERGER
GEORGE P LUCKEY
BY
ATTORNEY Patented July 12, 1932

1,866,660

UNITED STATES PATENT OFFICE

GEORGE P. LUCKEY, OF LANCASTER, PENNSYLVANIA, AND ALBERT F. HEGENBERGER, OF DAYTON, OHIO

PRESSURE INDICATOR

Application filed August 13, 1930. Serial No. 475,080.

The invention described herein may be manufactured and used by or for the Government for governmental purposes, without the payment to us of any royalty thereon.

The present invention relates generally to pressure indicating instruments or altimeters for measuring the atmospheric pressure, or the height above the earth by means of atmospheric pressure.

More particularly, the invention relates to pressure indicating instruments having compensating means to correct for temperature changes wherein the movement of the pressure responsive element of the instrument is bodily shifted to correct the indicating mechanism and compensate for errors due to the thermal effects on said pressure responsive element.

The invention has for a primary object, to provide a pressure indicating instrument of simple construction and one which is not only extremely accurate and sensitive for ranges of low as well as high pressure, but which is also construed in such manner as to withstand severe treatment without loss of accuracy in its indications.

The invention has for a further object to eliminate all complicated mechanism for actuating the indicating arm or pointer, thus reducing frictional losses to a minimum and as a consequence produce a more sensitive and accurate instrument.

A further object of the invention is to provide in a pressure indicating instrument, thermo-responsive means for adjusting the indicator in accordance with existing atmospheric conditions, in order that the indicator will register correctly in conjunction with its scale for any variation in temperature. With such a device constituting a part of the pressure indicating instrument, the thermo-responsive element of the instrument will act as a compensating medium and errors due to variations in temperature will be corrected by the automatic response of the thermo-responsive element.

A further object of the invention is to provide a thermo-responsive element which is so arranged with respect to the pressure responsive element as to have no detrimental effects on the indicator of the instrument and thus give a more accurate indication.

Heretofore it has been customary to introduce the thermal element of an altimeter between the diaphragm and the indicator. This arrangement presents among other disadvantages the disadvantage of increasing the weight of the instrument in general, of complicating the construction and function of the operating parts of the indicating mechanism, increasing the friction and effect of vibration and consequently resulting in a less reliable indicating instrument.

In accordance with our invention the thermo-responsive element is so arranged with respect to the pressure responsive element as to eliminate all of the disadvantages above specified and in addition thereto to provide a rigid and simple construction. This arrangement consists in providing a thermo-responsive element which is mechanically fixedly secured to the casing and upon which the pressure responsive element or diaphragm is mounted to be movable bodily relative to the casing with every change in temperature.

A further object of our invention is to provide in conjunction with a pressure indicating instrument two members having comparatively different thermal coefficients of expansion relative to one another, only one of which members is capable of freely flexing.

A further object of our invention is to provide a thermo-actuated element of novel construction wherein brazing of the two thermal members is eliminated, thus affording a wider choice of materials having relatively different temperature coefficients of expansion.

The invention is further characterized by the provision of a thermo-responsive element, the construction of which is such that the casing of the instrument itself forms one of the thermal elements, the other thermal element being mechanically rigidly secured to the casing and upon which latter the diaphragm forming the pressure responsive element of the instrument is mounted, the resultant relative movement effected by expansion and contraction of the thermal members of the thermo-responsive element moving the diaphragm to correct for changes in temperature. Heretofore in the construction of altimeters the diaphragm, being evacuated, had to be strong enough to withstand an atmospheric pressure of approximately 15 pounds per square inch. In accordance with our invention the diaphragm is sealed with contained gases at approximately normal atmospheric pressure, the expansion or contraction of the diaphragm due to temperature effects on the contained gases, as well as the expansion of the materials of the indicating mechanism being taken care of, or compensated by the responses of the thermo-responsive element. By providing the diaphragm with gases at normal atmospheric pressure at normal temperature, the strain which ordinarily occurs in an evacuate diaphragm is eliminated, thus permitting the use of lighter weight material with a resulting increase in expansion due to atmospheric pressure changes, allowing for and effecting a more accurate reading in the instrument.

Our invention also consists in certain other features of construction and in a combination and arrangement of the several parts to be hereinafter fully, clearly, and concisely described, defined in the appended claims and illustrated in the accompanying drawings, in which Figure 1 is a side elevation in vertical cross section of the indicating instrument, embodying our invention, and Figure 2 is a plan view thereof.

Referring more particularly to the drawing wherein similar parts are designated by like numerals throughout the various views, the indicating instrument in the embodiment of our invention herein illustrated comprises generally a casing 10 of suitable shape and construction and provided at its front end with a contiguous circumferential recess 12, as shown in Fig. 1. A glass bezel 13 is adapted to rest in the recess 12 and is held in place by means of the annular cover 14, the latter being secured to the casing 10 by means of screw threads 15 provided in the rim portion 16 of the cover, which are in turn adapted to engage with similar screw threads 17 formed on the exterior rim portion of the casing.

Centrally disposed within the casing 10 is a pressure responsive element, which preferably consists of a sealed expansible diaphragm 18, which is filled with gas under normal atmospheric pressure and at normal room temperature.

A dial 19 having a central aperture 20 is adapted to rest on a bracket 21, which is secured in place within the front portion of the casing 10 by means of screws 22, the dial 19 being secured in place in a like manner by means of screws 23, which are screwed into the bracket 21 as shown in Fig. 1.

The dial 19 in the illustrated embodiment is provided with a scale 24 arranged to indicate altitude in thousands of feet and fractions thereof and reading from zero to forty, as shown in Fig. 2.

The instrument further includes an indicating hand or pointer 25 cooperating with the scale 24 and carried by a shaft 26 which extends through the dial aperture 20 and is suitably journaled in the bracket 21 at its upper end as shown by numeral 27 and likewise journaled in the framework 28 at its lower end, the latter being carried by the bracket 21 heretofore mentioned. A coil spring 29 having its one end connected with the shaft 26 and its other end connected at any suitable point with the framework 28 serves to maintain the pointer in registry with the zero indication on the scale 24.

A drum 30 is carried by the shaft 26, the periphery of which is provided with a spiral groove 31 adapted to receive a fine thread or cord 32 of metal, fiber, silk, or other suitable material, the latter being fixedly secured to the drum 30 at its uppermost end and to the upper outer surface of the diaphragm 18 aforementioned at its lower end and guide 33 being suitably provided in the framework 28 to assist in guiding the thread 32 into registry with the spiral groove 31 as the drum is rotated.

The diaphragm 18 is secured for bodily movement relative to the casing 10 by means of a bent steel strip 34, which is substantially arcuate in cross section and which is fixedly secured to the base portion of the casing 10 by means of screws 35, the latter being located at the extreme outer ends of the strip as shown in Fig. 1.

It is intended that the casing 10 shall be made of brass or other like metal having a higher coefficient of expansion than the steel strip 34. From the foregoing it will be apparent that the supporting strip 34 and the brass portion of the casing 10 form a normal thermal element wherein soldering or brazing of the two members forming the thermal element is eliminated. Such a construction permits a greater choice of material having compensating relative different coefficients of expansion to choose from than would be the case were the thermal element composed of a composite strip of conventional character wherein it is necessary to solder or braze the two members together.

At normal altitudes at which atmospheric pressure is approximately fifteen pounds per square inch, which corresponds to the pressure within the sealed pressure responsive element, the pointer 25 is in registry with the zero indication on the scale 24. As the instrument is carried to progressively higher altitudes in which the density of the air decreases the atmospheric pressure upon the diaphragm 18 becomes correspondingly less so that the diaphragm gradually expands. In expanding in the manner set forth, the shaft carrying the pointer 25 is rotated to move the pointer over the scale through the actuating of the control spring 29 which is normally under tension at all times.

The thermal element of the instrument is adapted to adjust the pivotal point of the indicator according to temperature conditions so that the indicator will be in proper registry with the scale on dial at all times regardless of the altitude or change in temperature which may affect the expansion and contraction of the gases in the diaphragm and other parts.

From the foregoing description of the construction of our pressure indicating instrument, it will be seen that we have provided simple yet inexpensive and efficient means for carrying out the objects of our invention, and while we have particularly described the preferred embodiment of our invention best adapted to perform the functions set forth, it is obvious that various changes in form, proportion, and in the minor details of construction may be had without departing from the spirit of the invention.

From the foregoing description of the construction of our pressure indicating instrument, it will be seen that we have provided simple yet inexpensive and efficient means for carrying out the objects of our invention, and while we have particularly described the preferred embodiment of our invention best adapted to perform the functions set forth it is obvious that various changes in form, proportion, and in the minor details of construction may be had without departing from the spirit of the invention.

What we therefore claim as new and desire to secure by Letters Patent is:—

1. In a pressure indicating instrument in combination a casing, a dial therefor and having a scale thereon, an indicator cooperating with said scale, a sealed gas filled diaphragm, an indicator actuating mechanism actuated by said diaphragm and carrying said indicator, a thermo-responsive means for supporting said diaphragm, said means comprising a bi-metallic thermal element mounted on and forming a part of said casing, the portion of the thermal element forming the casing having a different temperature coefficient of expansion than the corresponding portion of the other thermal element, one portion of said thermal element being free to flex relative to the other thermal portion whereby flexing of said flexible thermal portion moves said diaphragm bodily to effect a movement of said indicator relative to its scale to compensate for errors due to temperature effects on the sealed gases in said diaphragm.

2. In a pressure indicating instrument in combination a casing, a dial therefor and having a scale thereon, an indicator cooperating with said scale, a sealed gas filled diaphragm, an indicator actuating mechanism actuated by said diaphragm and carrying said indicator, a thermo-responsive means for supporting said diaphragm, said means comprising a bi-metallic thermal element mounted on and forming a part of said casing, the portion of the thermal element forming the casing having a comparatively higher temperature coefficient of expansion than the corresponding portion of the other thermal portion, said last named thermal portion being arcuate in longitudinal cross section and fixedly secured at its ends to said casing and free to flex relative to the first named thermal portion whereby flexing of said flexible thermal portion moves said diaphragm bodily to effect a movement of said indicator relative to its scale to compensate for errors due to temperature effects on the sealed gases in said diaphragm.

In testimony whereof we affix our signatures.

GEORGE P. LUCKEY.
ALBERT F. HEGENBERGER.